(12) United States Patent
Ma

(10) Patent No.: US 10,507,376 B2
(45) Date of Patent: Dec. 17, 2019

(54) ELECTRICALLY POWERED RIDE-ON VEHICLE WITH INTUITIVE CONTROL

(71) Applicant: KOOFY INNOVATION LIMITED, Sheung Wan (CN)

(72) Inventor: Ondy Song Ki Ma, Hong Kong (CN)

(73) Assignee: KOOFY INNOVATION LIMITED, Central Sheung Wan (HK)

( * ) Notice: Subject to any disclaimer, the term of this patent is extended or adjusted under 35 U.S.C. 154(b) by 0 days.

(21) Appl. No.: 16/003,479

(22) Filed: Jun. 8, 2018

(65) Prior Publication Data

US 2018/0290045 A1 Oct. 11, 2018

Related U.S. Application Data

(63) Continuation of application No. 15/904,612, filed on Feb. 26, 2018, now Pat. No. 10,058,766, which is a
(Continued)

(51) Int. Cl.
*A63C 17/12* (2006.01)
*H04W 4/80* (2018.01)
(Continued)

(52) U.S. Cl.
CPC ............. *A63C 17/12* (2013.01); *A63C 17/01* (2013.01); *A63C 2203/12* (2013.01);
(Continued)

(58) Field of Classification Search
CPC . A63C 17/12; A63C 2203/12; A63C 2203/22; A63C 2203/24; H04W 4/80; H04W 84/12
See application file for complete search history.

(56) References Cited

U.S. PATENT DOCUMENTS

| 5,016,726 A | 5/1991 | Metcalf |
| 5,330,026 A | 7/1994 | Hsu et al. |

(Continued)

FOREIGN PATENT DOCUMENTS

| CA | 2492393 A1 | 1/2004 |
| CN | 2673465 Y | 1/2005 |

(Continued)

OTHER PUBLICATIONS

The ZBoard Electric Skateboard Store' [online], ZBoard, publication date unknown [retrieved on Jun. 28, 2016], retrieved from the Internet: [URL: http://www.zboardshop.com/].
(Continued)

*Primary Examiner* — Erez Gurari
(74) *Attorney, Agent, or Firm* — Millman IP Inc.

(57) ABSTRACT

In an aspect, a powered vehicle is provided, and includes a body to support a rider. At least one wheel is rotatably coupled to the body to enable travel of the body over a travel surface. At least one motor is coupled to at least one of the at least one wheel to drive rotation thereof. A power source is coupled to the at least one motor to power the at least one motor. A remote sensor unit is wearable by the rider and configured to detect at least one of an orientation, a position, and movement of the rider and transmit sensor data generated therefrom. A motor control unit is coupled to the at least one motor and is configured to receive the sensor data and control the operation of the at least one motor based at least in part on the sensor data.

16 Claims, 4 Drawing Sheets

Related U.S. Application Data continuation-in-part of application No. PCT/IB2017/050519, filed on Jan. 31, 2017.

(60) Provisional application No. 62/289,305, filed on Jan. 31, 2016.

(51) Int. Cl.
 *H04W 84/12* (2009.01)
 *A63C 17/01* (2006.01)

(52) U.S. Cl.
 CPC ...... *A63C 2203/22* (2013.01); *A63C 2203/24* (2013.01); *H04W 4/80* (2018.02); *H04W 84/12* (2013.01)

(56) References Cited

U.S. PATENT DOCUMENTS

| | | | |
|---|---|---|---|
| 5,797,466 | A | 8/1998 | Gendle |
| 5,893,425 | A | 4/1999 | Finkle |
| 6,182,779 | B1 | 2/2001 | Hosoda |
| 2004/0163867 | A1 | 8/2004 | Hillman |
| 2005/0121866 | A1 | 6/2005 | Kamen |
| 2008/0262666 | A1 | 10/2008 | Manning |
| 2009/0120705 | A1 | 5/2009 | McKinzie |
| 2010/0222941 | A1 | 9/2010 | Chang |
| 2013/0081891 | A1 | 4/2013 | Ulmen et al. |
| 2013/0206493 | A1 | 8/2013 | Larson |
| 2014/0027192 | A1 | 1/2014 | King |
| 2015/0297975 | A1 | 10/2015 | DiCarlo |
| 2015/0359457 | A1 | 12/2015 | Blumenthal |
| 2016/0339328 | A1 | 11/2016 | Simeray |
| 2017/0165560 | A1 | 6/2017 | Aders |
| 2017/0217511 | A1 | 8/2017 | Orlovskiy |
| 2018/0021663 | A1 | 1/2018 | Wood |
| 2018/0056170 | A1 | 3/2018 | Aders |

FOREIGN PATENT DOCUMENTS

| | | |
|---|---|---|
| CN | 101058024 A | 10/2007 |
| CN | 102205183 A | 10/2011 |
| CN | 202075852 U | 12/2011 |
| CN | 202740750 U | 2/2013 |
| CN | 203232269 U | 10/2013 |
| WO | WO2013149130 A1 | 10/2013 |

OTHER PUBLICATIONS

Carbot—Newest Patent 4 Wheel Electric Scooter, Powered Walk Car' [online], Shenzhen Counterbalance Technology Co., Ltd and Zhengzhou F-wheel Industrial Co., Ltd, 2012-2015 [retrieved on Jun. 28, 2016], retrieved from the Internet: [URL: http://www.fwheel.cc/Product-Self-Balancing-Electric-Unicycle/iCarbot-walkcar-four-wheel-scooter.html].

Motion Controller' [online], Wikimedia Foundation, Jun. 26, 2016 [retrieved Jun. 28, 2016], retrieved from the Internet: [URL: https://en.wikipedia.org/wiki/Motion_controller].

Boosted—The Ultimate Electric Skateboard' [online], Boosted Boards, 2016 [retrieved Jun. 28, 2016], retrieved from the Internet: [URL: https://boostedboards.com/].

PCT/IB2017/050519, International Search Report & Written Opinion, dated May 11, 2017, Chinese State Intellectual Property Office.

European Search Report issued Sep. 3, 2019 in connection with corresponding European application No. 17743832.2.

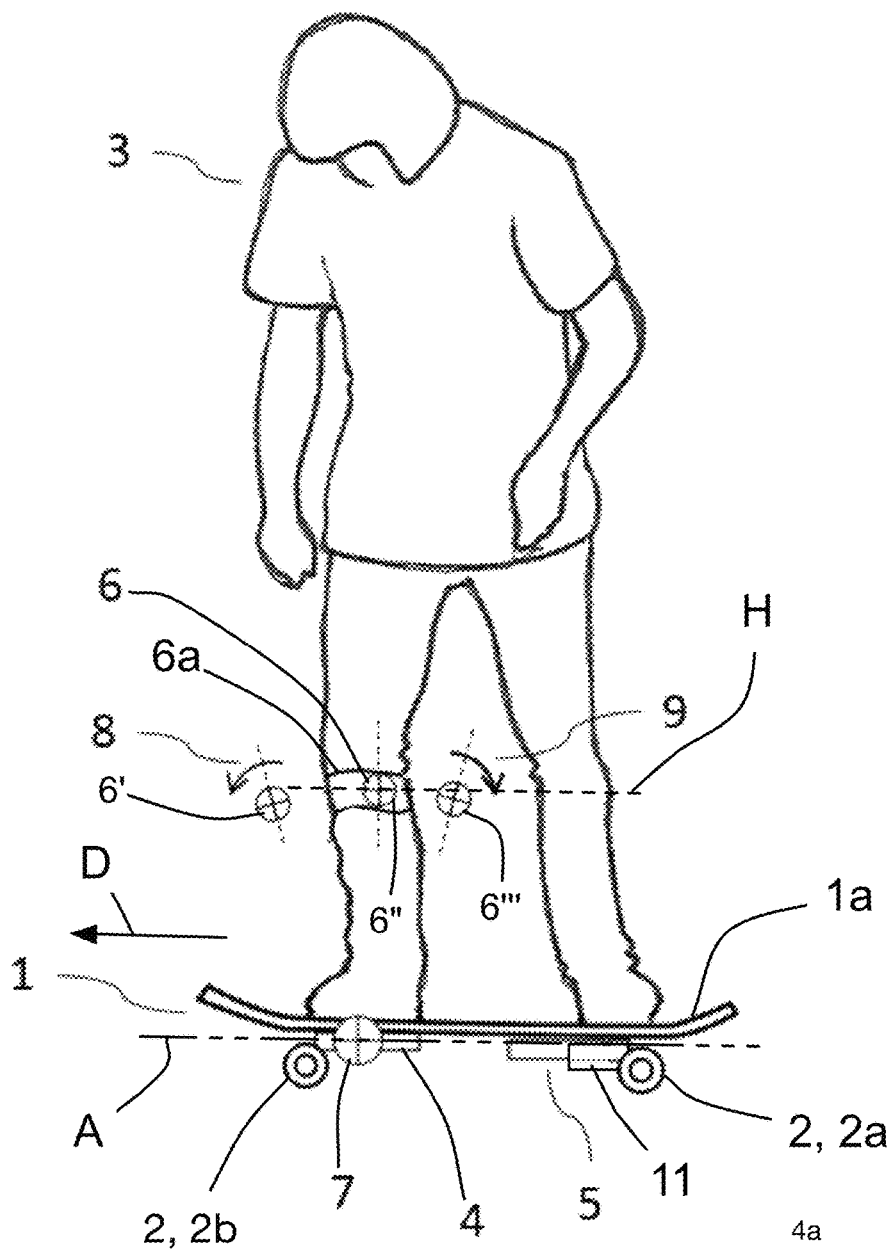
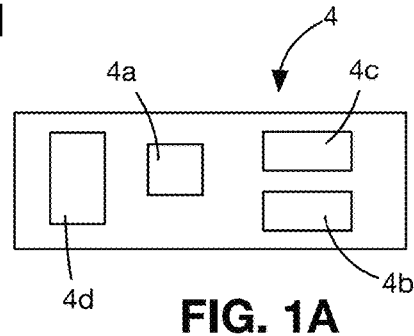
FIG. 1
FIG. 1A

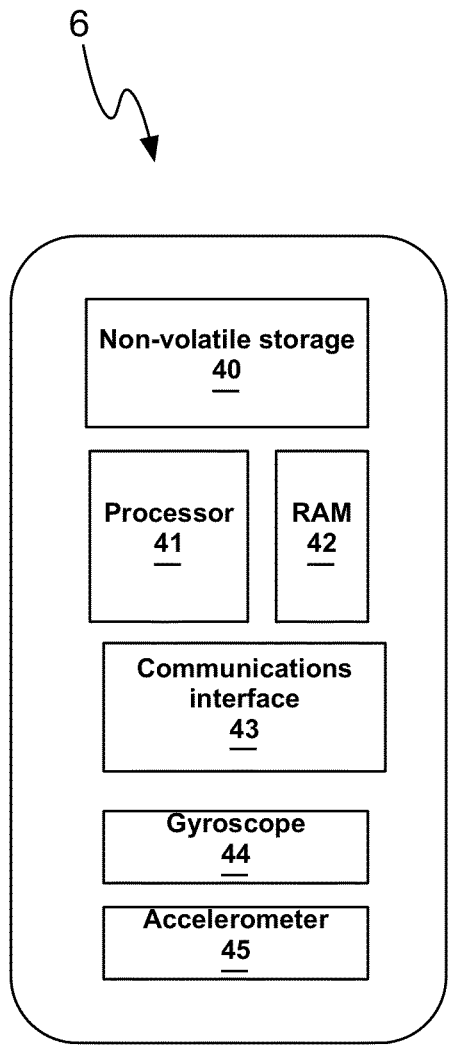
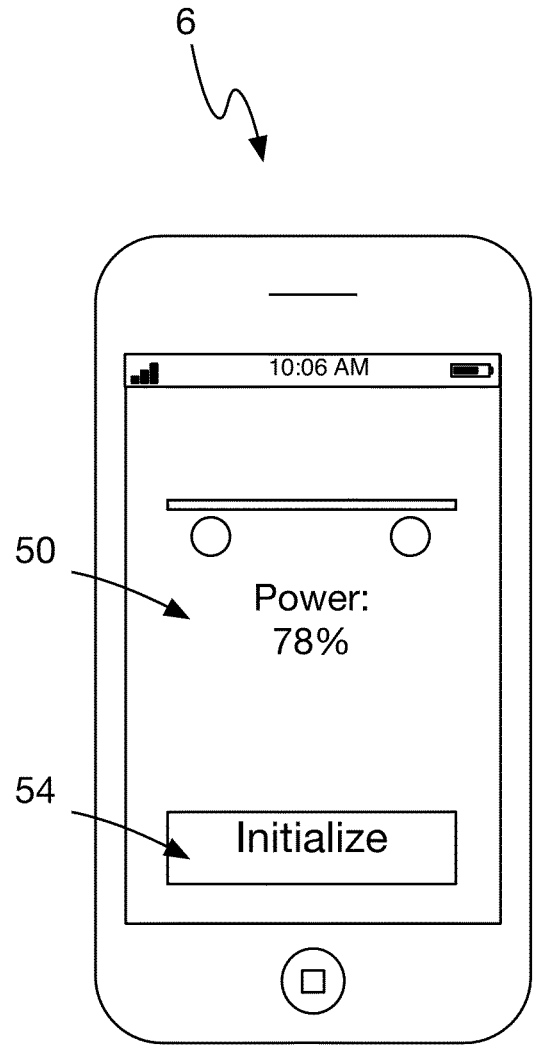
FIG. 2A    FIG. 2B

ELECTRICALLY POWERED RIDE-ON VEHICLE WITH INTUITIVE CONTROL

CROSS-REFERENCE TO RELATED APPLICATIONS

This application is a continuation of and claims the benefit of U.S. patent application Ser. No. 15/904,612, filed on Feb. 26, 2018, which is a continuation-in-part of and claims the benefit of PCT application PCT/IB2017/051519, filed on Jan. 31, 2017, which claims the benefit of U.S. Provisional Patent Application No. 62/289,305, filed on Jan. 31, 2016, the contents of both of which are incorporated herein by reference in their entirety.

FIELD

This disclosure relates to electrically powered ride-on vehicles, such as electrically powered scooters, skateboards and other foot deck-based vehicles.

BACKGROUND OF THE DISCLOSURE

Powered foot-deck-based vehicles are known in the art. For example, iCarbot markets a motorized wheeled board using pressure sensors on the standing platform to detect changes in weight distribution to drive the board.

Zboard sells a skateboard with powered wheels where pressure sensors on the board detect movement of the rider's feet to control the speed of the wheels.

CN202740750 U discloses an electric scooter controlled by so-called limb action, where infrared light sensors on the foot platform track the position and movement of a rider's feet. The tracked position and movement of the rider's feet is then used to control the electric scooter.

CA2492393A1 discloses an electric vehicle where its movement can be controlled via sensors on a foot-deck of the vehicle that detect the load distribution on the vehicle. Similarly, CN2673465Y discloses an electric vehicle where one or more sensors in a foot-deck of the vehicle detect the centre-of-gravity of a rider, which is used to control the movement of the vehicle.

CN203232269U discloses an electrically powered board with a remote control and a safety system, whereby the board stops automatically if the distance between the board and the remote control exceeds a selected minimum distance.

Boosted Boards (boostedboards.com) provides an electrically powered skateboard with a hand-held and operated remote control that provides commands to a controller on the skateboard via Bluetooth™ radio communications. The manual operation of the remote control while riding atop of the skateboard can be awkward and unintuitive, and can interfere with the rider's use of his arms to control his or her balance on the skateboard.

SUMMARY OF THE DISCLOSURE

In one aspect, there is provided a powered foot-deck-based vehicle, comprising a foot-deck configured to support a rider thereon, at least one wheel rotatably coupled to the foot-deck to enable travel of the foot-deck over a travel surface, at least one motor coupled to at least one of the at least one wheel to drive rotation thereof, a power source coupled to the at least one motor to power the at least one motor, a remote sensor unit that is wearable by the rider and is configured to detect at least one of an orientation, a position, and movement of the rider and transmit sensor data generated therefrom, and a motor control unit coupled to the at least one motor and configured to receive the sensor data from the remote sensor unit and control the operation of the at least one motor based at least in part on the sensor data.

In one aspect, there is provided a powered, foot-deck-based vehicle, comprising a foot-deck configured to support a rider thereon, at least one wheel rotatably coupled to the foot-deck to enable travel of the foot-deck over a travel surface, at least one motor coupled to at least one of the at least one wheel to drive rotation thereof, a power source coupled to the at least one motor to power the at least one motor, a remote sensor unit that is wearable by the rider and is configured to detect at least one spatial property of the remote sensor selected from an orientation, a position, and movement and is configured to transmit sensor data generated therefrom, and a motor control unit coupled to the at least one motor and configured to receive the sensor data from the remote sensor unit and control the operation of the at least one motor based in part on the at least one spatial property and based in part on a rate of change of the at least one spatial property. The motor control unit changes power to the motor at a first rate of change of power during movement of the remote sensor unit at a first rate of change of position, and the motor control unit changes power to the at least one motor at a second rate of change of power that is lower than the first rate of change of power during movement of the remote sensor unit at a second rate of change of position that is lower than the first rate of change of position.

In either of the aspects noted above, certain optional features may be provided, including:

The remote sensor unit can comprise a three-axis gyroscope, and the sensor data can comprise the orientation of the remote sensor unit.

The remote sensor unit can comprise a three-axis accelerometer, and the sensor data can comprise the movement of the remote sensor unit.

The remote sensor unit can comprise a three-axis accelerometer, the remote sensor unit can determine the position of the remote sensor unit relative to a reference position, and the sensor data can comprise the position of the remote sensor unit.

The motor control unit can control the power delivered to the at least one motor.

The remote sensor unit can comprise a wireless transmission module configured to transmit the sensor data to the motor control unit.

The wireless transmission module can communicate with the motor control unit via the Bluetooth™ wireless technology standard.

The wireless transmission module can communicate with the motor control unit via the Wi-Fi™ wireless networking standard.

The remote sensor unit can comprise a light transmission module configured to transmit the sensor data to the motor control unit.

The light transmission module can communicate with the motor control unit via infrared light.

The remote sensor unit can be coupled to the motor control unit via a communications cable over which the remote sensor unit is configured to communicate the sensor data to the remote control unit over the communications cable.

The remote sensor unit can comprise a smartphone.

The remote sensor unit can comprise an actuatable user control to initialize the at least one of the orientation and the position of the remote sensor unit.

The at least one of the orientation and the position can be determined relative to the foot-deck.

The motor control unit can be programmed to reduce speed of the electric vehicle (optionally to a speed of zero) upon determining that a distance between the remote sensor unit and the rest of the electric vehicle exceeds a selected distance.

The remote sensor unit can be programmed to control a plurality of settings for the vehicle.

In some embodiments, motion control for an electric vehicle can be achieved using a prime mover and a secondary mover, wherein movements in the primary mover are detected by sensors such as gyros, accelerometers and the like, and signals sent to a control unit which causes a secondary mover to act in a selected way. This is different than remote control or control by direct sensing of pressure.

In an aspect, an electric vehicle is disclosed, having at least one motorized wheel and a platform for a rider to stand on, a motor control unit mounted on the platform and a wearable remote sensor unit which is in wireless connection with the control unit. A rider of the vehicle is able to initialize the wireless connection between the vehicle control unit and the remote sensor unit, whereby the initial 3D orientation of the remote sensor unit and its distance from the control unit is established. Once initialized, the system allows the rider to control the vehicle intuitively by leaning forwards, remaining still or leaning backwards in relation to the vehicle. This pattern mimics the natural, intuitive movements of a skateboard rider. The system also provides a safety function, whereby the speed of the vehicle is slowed down if the relative distance between the control unit and the remote sensor unit exceeds a predefined maximum safety distance. The innovation brings an intuitive and exciting riding experience than at least some electric vehicles currently available.

In another aspect, an electric vehicle is provided, and includes a platform positioned to support a rider, at least one motorized wheel rotatably connected to the platform and configured to drive movement of the platform along a support surface, a power source for powering the at least one motorized wheel, a remote sensor unit that is wearable by the rider and is configured to detect motion of the rider; and a motor control unit that receives signals from the remote sensor unit and controls the operation of the at least one motorized wheel based at least in part said signals.

Some embodiments of the electric vehicle described herein respond to a rider's natural movements without the need for pressure sensors, thereby eliminating the need for the rider to apply pressure to certain parts of a device in order to achieve certain desired movements.

Some embodiments of the electric vehicle described herein respond to a rider's natural movements without the need for the rider to apply to move their hands or feet in certain ways or to certain positions, or to operate a control panel while riding the electric vehicle.

In some embodiments, the electric vehicle includes a power source and at least one motorized wheel, a programmable motor control unit for controlling power to the wheels, and a wearable remote sensor unit in wireless connection with the motor control unit. The remote sensor unit is able to sense 3D orientation and distance to the motor control unit. The system comprises an algorithm for operation in at least three states including an initialization state, a safety state and a control state. In the initialization state, the rider can manually give input in order to start the system up. During initialization, starting parameters are recorded by the system in order to calibrate it for the starting orientation and position of the remote sensor unit. In the safety state, the system monitors the relative distance between the motor control unit and the remote sensor unit. If the distance exceeds a selected value, the motor control unit will slow down the speed of the motorized wheels. In the control state, the system monitors the 3D orientation of the remote sensor unit, which is worn by the rider. If rider leans forward, the 3D orientation of the motion sensor will change in one angular direction and motor control unit will accelerate the at least one wheel. If the rider remains stable, the speed of the at least one wheel will remain unchanged. If the rider leans backwards, the 3D orientation of the motion sensor will change in another angular direction the speed of the at least one wheel will be reduced.

In another aspect, a powered, foot-deck-based vehicle is provided, comprising a foot-deck configured to support a rider thereon, at least one wheel rotatably coupled to the foot-deck to enable travel of the foot-deck over a travel surface, at least one motor coupled to at least one of the at least one wheel to drive rotation thereof, a power source coupled to the at least one motor to transmit power the at least one motor, a remote sensor unit that is wearable by the rider and is configured to detect at least one spatial property selected from an orientation, a position, and movement of the rider and is configured to transmit sensor data generated therefrom, and a motor control unit coupled to the at least one motor and configured to receive the sensor data from the remote sensor unit and to control the operation of the at least one motor based in part on the at least one spatial property and based in part on a rate of change of the at least one spatial property. The motor control unit is configured to decelerate the vehicle if a distance between the remote sensor unit and the motor control unit exceeds a selected safety distance.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 1 is a side view of a schematic diagram of an electric skateboard according to an embodiment, with a rider;

FIG. 1A is a schematic illustration of a motor control unit that is part of the electric skateboard shown in FIG. 1;

FIG. 2A is a schematic representation of a smartphone for use with the electric skateboard of FIG. 1;

FIG. 2B is a front view of the smartphone of FIG. 2A, showing elements displayed on a display of the smartphone;

DETAILED DESCRIPTION

Figure 3:
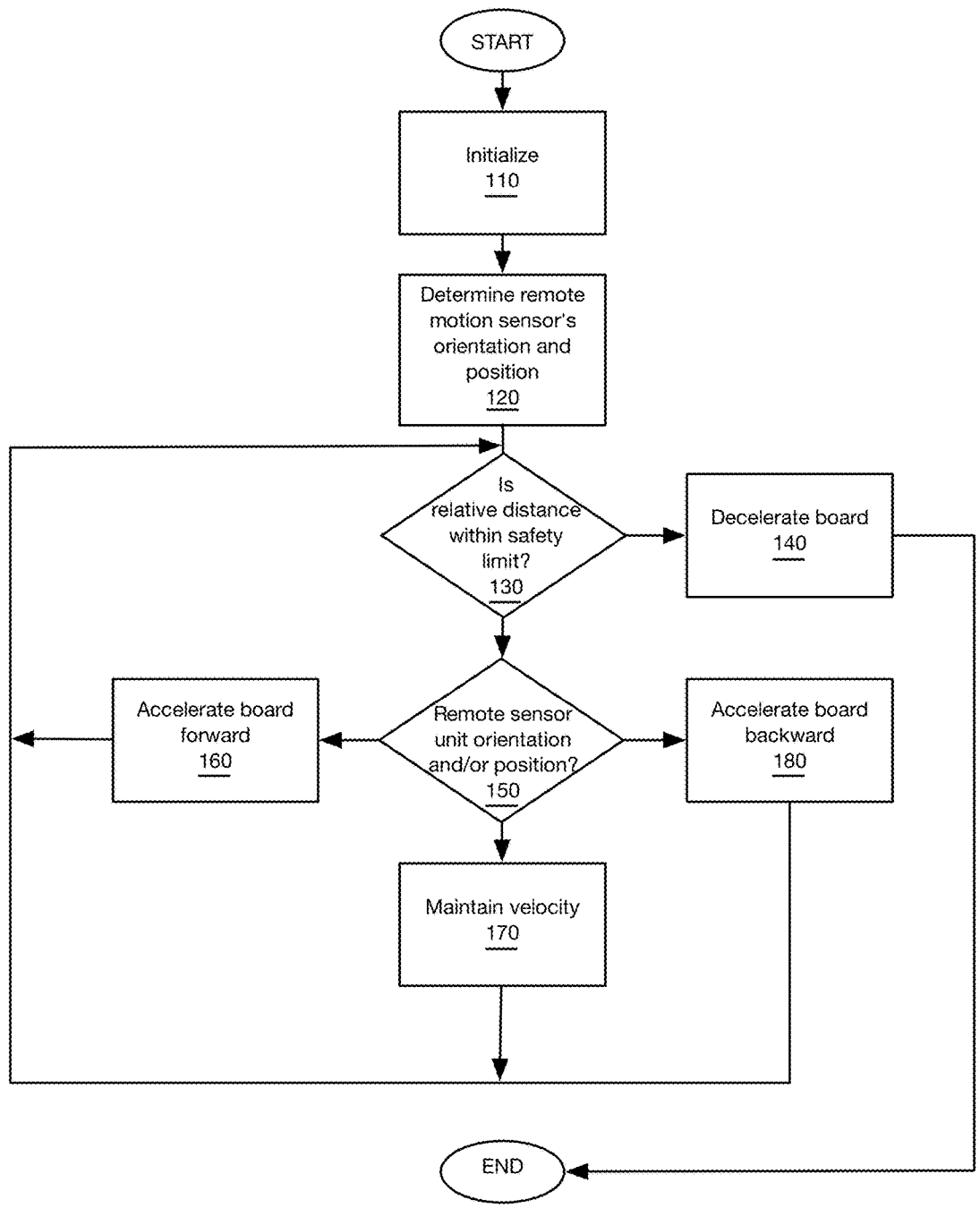
FIG. 3 shows a state transition diagram of the motor control unit in the electric skateboard shown in FIG. 1.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

According to an embodiment and referring to FIG. 1, a powered foot-deck-based vehicle in the form of an electric skateboard 1 is provided. While the powered foot-deck-based vehicle is illustrated and described as an electric skateboard, it should be appreciated that other types of powered foot-deck-based vehicles can be employed, such as scooters, one- and two-wheeled self-balancing boards, etc. The electric skateboard 1 has a foot-deck that is in the shape of an elongated board 1a, wherein a rider 3 may ride the electric skateboard 1 while the rider 3 stands in a generally sideways orientation relative to a longitudinal axis A of the board 1a. The board 1a may have any suitable number of wheels 2. In the illustrated embodiment, the electric skateboard 1 has four wheels 2 mounted in pairs rotatably coupled to the board 1a on trucks. In other embodiments, the foot-deck-based vehicle can have any number of wheels. In one alternative embodiment, the foot-deck-based vehicle can have one or two wheels and can be self-balancing. In another alternative embodiment, the foot-deck-based vehicle can be a scooter that has two, three, or four wheels. A motor 11 is coupled to at least one of the four wheels 2 of the electric skateboard 1 for travel over a travel surface, such as pavement, asphalt, etc. In particular, the motor 11 is coupled to a pair of rear wheels 2a on the rear truck of the electric skateboard 1 and drives the rotation of the rear wheels 2a. The wheels 2 also include a pair of front wheels 2b that are not driven by the motor 11. In other embodiments, two or more motors can be employed and may each drive one or more wheels.

In the embodiment illustrated in FIG. 1, the rear pair of wheels 2 are driven by the motor 11 relative to the intended travel direction for the electric skateboard 1, which is shown at D.

A power source 5 is coupled to the motor 11 to power the motor 11. The power source 5 can include a single power module such as a rechargeable battery pack or fuel cell, or can alternatively include two or more power modules.

A motor control unit 4 is coupled to the motor 11 and has a receiver module 7 that is attached to the board 1a, preferably to the underside of the board 1a. The motor control unit 4 controls the operation of the motor 11, such as by controlling the delivery of power to the motor 11. As shown schematically in FIG. 1A, the motor control unit 4 may include a processor 4a for running a program, random-access-memory (RAM) 4b, where values can be stored temporarily during calculations or during running of the program of the motor control unit 4, non-volatile memory 4c for storage of the program, and a communications interface 4d permitting communication between the motor control unit 4.

A rider 3 is equipped with a wearable remote sensor unit 6. The wearable remote sensor unit 6 is wearable by the rider 3 and may preferably be removably attached to the rider 3 via an elastic strap 6a or the like. The remote sensor unit 6 is positioned approximately at knee-height of the rider 3 indicated generally at H. Preferably, the remote sensor unit 6 is held tightly against the rider 3 so that movement of the rider 3 is immediately translated into motion of the remote sensor unit 6.

FIG. 2A shows an exemplary remote sensor unit 6. In this illustrated example, the remote sensor unit 6 is a smartphone. The smartphone has non-volatile storage 40 storing an operating system and applications used by the smartphone, a processor 41 configured to execute the operating system and applications, random access memory 42 providing relatively fast temporary storage for the processor 41, a communications interface 43, a gyroscope 44, and an accelerometer 45. The communications interface 43 in this case is a wireless radio configured for Bluetooth communications in accordance with the Bluetooth wireless technology standard. In other scenarios, the communications interface 43 can be configured to communicate via the Wi-Fi wireless networking standard or some other suitable radio frequency communications standard. In further embodiments, the communications interface 43 can include a light transmission module that is configured to transmit data via light, such as infrared light. In still further embodiments, the communications interface 43 of the smartphone may be coupled to the motor control unit 4 via a communications cable that has a magnetic connector to enable rapid disconnection of the smartphone and connector cable to the motor control unit in case the rider becomes separated from the electric skateboard 1, such as during a fall.

The smartphone also includes two sensors in the form of a gyroscope module 44 and an accelerometer module 45. The gyroscope module 44 may be, for example, a three-axis gyroscope, but can include any other type and number of gyroscopes. The gyroscope module 44 determines the orientation of the smartphone. The accelerometer module 45 includes a three-axis accelerometer in the illustrated embodiment, but can alternatively include any other type and number of accelerometers. The accelerometer module 44 determines the movement of the smartphone.

FIG. 2B shows a screen of an application for operating the electric skateboard 1 executing on the smartphone. The screen indicates a power level of the power source 5 of the electric skateboard 1. Further, the screen provides an actuatable user control in the form of a GUI button 54 to initialize the remote sensor unit 6. During initialization, the smartphone determines a reference orientation via the gyroscope module 44. Further, it determines a reference position. After initialization, the smartphone collects sensor data from the gyroscope module 44 and the accelerometer module 45. In the illustrated embodiment, the smartphone communicates the sensor data to the motor control unit 4 of the electric skateboard 1. Alternatively, the remote sensor unit can process the sensor data from the accelerometer module 45 to determine its position relative to the reference position determined at initialization. In turn, the motor control unit 4 processes the sensor data to determine how to control the motor 11 that powers the wheels 2a.

The remote sensor unit can alternatively be another type of device, such as a purpose-built apparatus that has an accelerometer and a gyroscope. Further, an actuatable user control can be provided to initialize the system.

Now referring mainly to FIG. 3 in addition to FIGS. 1, 2A, and 2B, according to the preferred embodiment, the system comprising the motor control unit 4, the receiver module 7 and the remote sensor unit 6 may have a programmed method shown in FIG. 3, broadly comprising three states. In a first state 110, i.e., the initialize state, a rider 3 may be able to prepare for riding the vehicle 1 by initializing the system, such as by actuating the GUI button 54, whereby the initial 3D orientation and position of the remote sensor unit 6, relative to the motor control unit 4, is determined at 120 and the power to the motor 11 and thus the rear wheels 2a is enabled. Preferably, the rider 3 can press a key on the remote sensor unit 6 to enter the initialization state.

In a second state, i.e., the safety state, the system may maintain the connection between the motor control unit 4 and remote sensor unit 6 constantly to check whether the relative distance between the remote sensor unit 6 and the motor control unit 4 exceeds a selected distance (optionally referred to as a 'safety distance') (130). If the distance exceeds the selected safety distance, the power to the motor 11 may be reduced in order to slow the electric skateboard 1 down to a stop (140). In other embodiments, the electric skateboard 1 may just be slowed down somewhat.

In a third state, i.e., the control state, the system is able to detect three main scenarios by examining the received sensor data from the remote sensor unit 6, including its orientation and position (150). If the remote sensor unit 6 changes its 3D orientation in a forward direction (e.g., when the rider 3 leans forward), the power to the motor 11 driving the driven rear wheels 2a may be progressively increased (160). If the remote sensor unit 6 maintains constant 3D orientation relative to the initial state, then the power to the wheels 2 may be kept constant (170). If the remote sensor unit 6 changes its 3D orientation in a rearward direction 9, the power to the motor 11 powering the wheels 2a may be progressively reduced, optionally sufficiently to stop the electric skateboard 1 (180). Since the remote control unit 6 is attached to (i.e., worn by) the rider 3 preferably at knee height as indicated at H, the rider 3 is able to control the power transmitted to the wheels 2 by leaning forward 6', staying in the start position 6" or leaning backwards 6'". In other words, it may be said that the system controls power to the motor based on the received sensor data from the remote sensor unit 6 so as to accelerate or decelerate the vehicle based on the received sensor data. An intuitive control of the electric skateboard 1 is provided in this way.

The vehicle and the algorithm to control a vehicle are not limited to the embodiments described above, but may also take other forms which should be obvious for a person skilled in the art. Thus, the described vehicle according to another embodiment may have a foot platform where the intended travel direction is oriented fore-aft related to the position of a rider's feet. It is also possible that the vehicle according to other embodiments may have any number of wheels other than four, for example it is perceivable for such a vehicle to have two wheels mounted individually on trucks, or even one single wheel individually mounted. It will be understood that any one of the wheels provided may be motorized as long as sufficient ground friction is provided at all times. According to yet another embodiment, the provided remote sensor unit may be attached to the rider in other ways, for example it may attached to the rider's clothes in any location using adhesive, stitching, Velcro or similar, or even attached directly to a rider's skin or hand-held. It is also obvious to someone skilled in the art that the remote sensor unit could be provided in a smartphone such as the Apple™ iPhone™, which incorporate motion sensors such as a three-axis accelerometer and communication hardware to communicate via Bluetooth, Wi-Fi™. It should also be understood by one skilled in the art that the motor control unit may be positioned anywhere on the vehicle. According to other embodiments of the innovation, the described algorithm (FIG. 2) may comprise more states than those described, such as states enabling fast acceleration, fast braking or turning.

Figure 4:
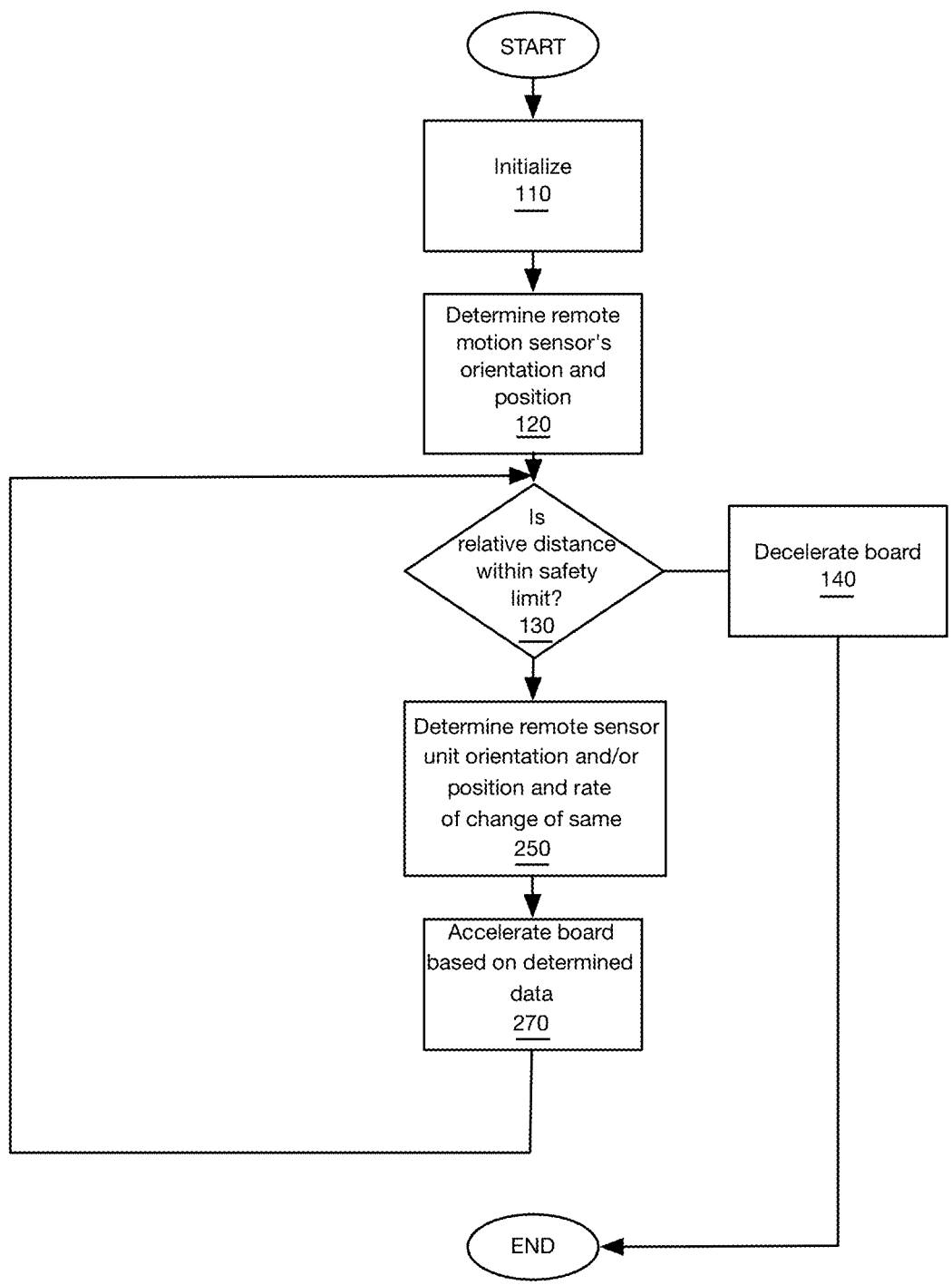
FIG. 4 shows an alternative state transition diagram of the motor control unit in the electric skateboard shown in FIG. 1.

Reference is made to FIG. 4, which illustrates another method of control of the vehicle. The method illustrated in FIG. 4 may be similar to the method shown in FIG. 3, and may include the same first two states, namely the first or initialize state 110 and the second or safety state 130. The third state, namely, the control state is shown at 250 may be different than the control state illustrated in FIG. 3. In the control state in FIG. 4, the system receives sensor data from the remote sensor unit 6, including at least one of the orientation and position of the remote sensor unit 6 and the rate of change of the at least one of the orientation and position of the remote sensor unit (state 250). If the remote sensor unit 6 changes its 3D orientation in a forward direction (e.g., when the rider 3 leans forward), the power to the motor 11 driving the driven rear wheels 2a may be progressively increased (160). If the remote sensor unit 6 maintains constant 3D orientation relative to the initial state, then the power to the wheels 2 may be kept constant (170). If the remote sensor unit 6 changes its 3D orientation in a rearward direction 9, the power to the motor 11 powering the wheels 2a may be progressively reduced, optionally sufficiently to stop the electric skateboard 1 (180). Since the remote control unit 6 is attached to (i.e., worn by) the rider 3 preferably at knee height as indicated at H, the rider 3 is able to control the power transmitted to the wheels 2 by leaning forward 6', staying in the start position 6" or leaning backwards 6'". In other words, similar to the embodiment in FIG. 3, it may be said that the system controls power to the motor based on the received sensor data from the remote sensor unit 6 so as to accelerate or decelerate the vehicle based on the received sensor data. However, the system controls power to the motor 11 not just based on position and/or orientation data for the remote sensor unit 6, but also, as noted above, based on rate of change of the said position and/or orientation data for the remote sensor unit 6. Therefore, the profile over time of the power transmitted to the motor 11 will be different if the user moved the remote sensor unit 6 quickly to a new position, then it would be if the user moved the remote sensor unit 6 more slowly to the same new position. For example, power may be increased or decreased to the motor 11 at a higher rate if the user moves the remote sensor unit 6 quickly to a new position, than if the user moves the remove sensor unit 6 less quickly to the new position. This is a more intuitive control than of the vehicle than even the embodiment described in FIG. 3.

It can be seen from FIG. 4 and the description above, that the remote sensor unit 6 is configured to detect at least one spatial property of the remote sensor unit 6 (and therefore of the rider 3) selected from an orientation, a position, and movement and is configured to transmit sensor data generated therefrom. It can also be seen that the motor control unit 4 is configured to receive the sensor data from the remote sensor unit 6 and to control the operation of the at least one motor based in part on the at least one spatial property and based in part on a rate of change of the at least one spatial property. The rate of change of the at least one spatial property may be sent from the remote sensor unit 6 to the motor control unit 4. Alternatively, the motor control unit 4 may calculate the rate of change of the at least one spatial property based on at least one stored prior value for the at least one spatial property and at least one associated stored time stamp for the at least one stored prior value. For example, in an embodiment where the at least one spatial property is position, the remote sensor unit 6 may transmit a first position P1 at time t1, and may transmit a second position P2 at time t2. The motor control unit 4 may receive the first position P1 at time t1, and then may receive the new position P2 at time t2, and stores P1, P2, t1 and t2 in different memory locations in its memory. The motor control unit 4 may then calculate the value for the rate of change of the position of the remote sensor unit 6 (e.g. by calculating (P2−P1)/(t2−t1)). The value for the rate of change of the position may itself be stored in yet another memory location. The motor control unit 4 may change the power sent to the motor 11 to a new value that is based on the new position P2 and may control the rate of change of power being sent to the motor based on the calculated rate of change of position.

In an example, the motor control unit 4 changes power to the motor 11 at a first rate of change of power during movement of the remote sensor unit 6 at a first rate of change of position, and the motor control unit 4 changes power to the at least one motor at a second rate of change of power that is lower than the first rate of change of power during movement of the remote sensor unit at a second rate of change of position that is lower than the first rate of change of position.

By contrast, in some devices of the prior art, where, for example, a remote control is provided to control operation of a foot-deck-based vehicle, the system increases or decreases power to the motor 11 at a fixed rate of change, regardless of how quickly the user has moved the remote sensor unit 6 to a new position.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An electrically powered ride-on vehicle, comprising:
a body configured to support a rider thereon;
at least one wheel rotatably coupled to the body to enable travel of the body over a travel surface;
at least one motor coupled to at least one of the at least one wheel to drive rotation thereof;
a power source coupled to the at least one motor to power the at least one motor;
a remote sensor unit that is holdable by the rider and is configured to detect at least one spatial property of the remote sensor unit selected from an orientation, a position, and movement of the rider and is configured to transmit sensor data generated therefrom; and
a motor control unit coupled to the at least one motor and configured to receive the sensor data from the remote sensor unit and to control the operation of the at least one motor based in part on the at least one spatial property and based in part on a rate of change of the at least one spatial property,
wherein the motor control unit changes power to the motor at a first rate of change of power during movement of the remote sensor unit at a first rate of change of position, and the motor control unit changes power to the at least one motor at a second rate of change of power that is lower than the first rate of change of power during movement of the remote sensor unit at a second rate of change of position that is lower than the first rate of change of position,
wherein the remote sensor unit comprises a three-axis accelerometer, and wherein the at least one spatial property includes the movement of the remote sensor unit.

2. An electrically powered ride-on vehicle as claimed in claim 1, wherein the remote sensor unit comprises a three-axis gyroscope, and wherein the at least one spatial property includes the orientation of the remote sensor unit.

3. An electrically powered ride-on vehicle as claimed in claim 1, wherein the remote sensor unit determines the position of the remote sensor unit relative to a reference position, and wherein the at least one spatial property comprises the position of the remote sensor unit.

4. An electrically powered ride-on vehicle as claimed in claim 1, wherein the remote sensor unit comprises a wireless transmission module configured to transmit the sensor data to the motor control unit.

5. An electrically powered ride-on vehicle as claimed in claim 4, wherein the wireless transmission module communicates with the motor control unit via the Bluetooth™ wireless technology standard.

6. An electrically powered ride-on vehicle as claimed in claim 4, wherein the wireless transmission module communicates with the motor control unit via the Wi-Fi™ wireless networking standard.

7. An electrically powered ride-on vehicle as claimed in claim 1, wherein the remote sensor unit comprises a light transmission module configured to transmit the sensor data to the motor control unit.

8. An electrically powered ride-on vehicle as claimed in claim 7, wherein the light transmission module communicates with the motor control unit via infrared light.

9. An electrically powered ride-on vehicle as claimed in claim 1, wherein the remote sensor unit is coupled to the motor control unit via a communications cable over which the remote sensor unit is configured to communicate the sensor data to the remote control unit over the communications cable.

10. An electrically powered ride-on vehicle as claimed in claim 1, wherein the remote sensor unit is a smartphone.

11. An electrically powered ride-on vehicle as claimed in claim 1, wherein the remote sensor unit includes an actuatable user control to initialize the remote sensor unit so as to set a relationship between the at least one spatial property of the remote sensor unit and at least one selected spatial property of the body.

12. An electrically powered ride-on vehicle as claimed in claim 1, wherein the at least one of the orientation and the position are determined relative to the body.

13. An electrically powered ride-on vehicle as claimed in claim 1, wherein the motor control unit is programmed to reduce speed of the electric vehicle upon determining that a distance between the remote sensor unit and the rest of the electric vehicle exceeds a selected distance.

14. An electrically powered ride-on vehicle as claimed in claim 1, wherein the remote sensor unit is programmed to control a plurality of settings for the vehicle.

15. An electrically powered ride-on vehicle, comprising:
a body configured to support a rider thereon;
at least one wheel rotatably coupled to the body to enable travel of the body over a travel surface;
at least one motor coupled to at least one of the at least one wheel to drive rotation thereof;
a power source coupled to the at least one motor to transmit power the at least one motor;

a remote sensor unit that is wearable by the rider and is configured to detect at least one spatial property of the remote sensor selected from an orientation, a position, and movement of the rider and is configured to transmit sensor data generated therefrom; and a motor control unit coupled to the at least one motor and configured to receive the sensor data from the remote sensor unit and to control the operation of the at least one motor based in part on the at least one spatial property and based in part on a rate of change of the at least one spatial property, wherein the motor control unit is configured to decelerate the vehicle if a distance between the remote sensor unit and the motor control unit exceeds a selected safety distance.

16. An electrically powered ride-on vehicle, comprising:
a body configured to support a rider thereon;
at least one wheel rotatably coupled to the body to enable travel of the body over a travel surface;
at least one motor coupled to at least one of the at least one wheel to drive rotation thereof;
a power source coupled to the at least one motor to power the at least one motor;
a remote sensor unit that is holdable by the rider and is configured to detect at least one spatial property of the remote sensor unit selected from an orientation, a position, and movement of the rider and is configured to transmit sensor data generated therefrom; and a motor control unit coupled to the at least one motor and configured to receive the sensor data from the remote sensor unit and to control the operation of the at least one motor based in part on the at least one spatial property and based in part on a rate of change of the at least one spatial property, wherein the motor control unit changes power to the motor at a first rate of change of power during movement of the remote sensor unit at a first rate of change of position, and the motor control unit changes power to the at least one motor at a second rate of change of power that is lower than the first rate of change of power during movement of the remote sensor unit at a second rate of change of position that is lower than the first rate of change of position, wherein the remote sensor unit comprises a three-axis accelerometer, wherein the remote sensor unit determines the position of the remote sensor unit relative to a reference position, and wherein the at least one spatial property comprises the position of the remote sensor unit.

* * * * *